3,833,581
VAPOR PHASE SUBSTITUTION FLUORINATION
OF AROMATICS WITH XENON DIFLUORIDE

Donald R. MacKenzie, Bellport, Jack Fajer, Brookhaven, and Robert Smol, East Patchogue, N.Y., assignors to the United States of America as represented by the United States Atomic Energy Commission
No Drawing. Filed July 23, 1971, Ser. No. 165,591
Int. Cl. C07c 25/00; C07d 51/76
U.S. Cl. 260—250 R  2 Claims

ABSTRACT OF THE DISCLOSURE

The process of producing a fluorine-substituted aromatic compound comprising the step of reacting an aromatic compound in the vapor phase with xenon difluoride vapor at a moderate temperature on the order of about 200° C. at a mole ratio of xenon difluoride to said aromatic compound of no greater than 1.

SOURCE OF THE INVENTION

This invention was made in the course of, or under a contract with the United States Atomic Energy Commission.

BACKGROUND OF THE INVENTION

Fluorinated aromatic compounds have attracted interest in recent years because of their great stability in a reactor environment as coolants and as high temperature heat transfer mediums. The fully saturated compound is less stable, apparently due to the alteration of the aromatic structure during fluorination.

By fluorinated aromatic compound is meant an aromatic compound in which only the hydrogen atoms present are replaced by fluorine atoms. This compound is also referred to as a fluorine-substituted aromatic compound.

The production of fluorine-substituted aromatic compounds has been accomplished by utilizing $XeF_2$ in liquid $CCl_4$ solution and carrying out the substitution at low temperatures, such as —70° C. After substitution, the solvent is removed.

The liquid fluorine substitution process just described while useful is somewhat slow and requires the removal of the solvent before the fluorinated aromatic compounds can be used.

SUMMARY OF THE INVENTION

The present invention improves upon the previous described process for the production of fluorine-substituted aromatics from aromatics, substituted aromatics, heterocyclic aromatics, and fused-ring aromatics by conducting the substitution with the reactants in the vapor state, without the presence of any solvents.

In accordance with this invention, $XeF_2$ vapor is added to a closed reactor vessel containing the liquid or solid aromatic compound at ambient pressure and temperature at a mole ratio of $XeF_2$ to said aromatic compound no greater than one, heating the reactor vessel and its contents until the compound is vaporized, and after a period of a few minutes to permit the fluorination process to occur, cooling the vessel to freeze the fluorinated aromatic compound so as to permit pumping off the gaseous unwanted products.

It is thus a principal object of this invention to prepare fluorine-substituted aromatic compounds at a moderate temperature and free of solvents.

Other objects and advantages of this invention will hereinafter become evident from the following description of preferred embodiments of this invention.

DESCRIPTION OF THE PREFERRED EMBODIMENTS

In accordance with a preferred embodiment of this invention, the liquid or solid aromatic compound is placed into a closed reactor vessel, the air is evacuated, and $XeF_2$ vapors are transferred into the reactor vessel. The vessel is then heated until the aromatic compound is completely in the vapor phase. After a few minutes during which time the $XeF_2$ and aromatic vapors react, the vessel is cooled to —78° C. when the vessel is evacuated to remove the HF and Xe. The temperature is raised to ambient and the fluorinated aromatic compound in the vessel may be removed for use or storage.

It will be noted that the fluorination takes place rapidly under the conditions described. The organic compounds are those which are obtained commercially and are pure enough to be used as received. Aromatic compounds which have been used successfully in accordance with this invention include benzene, nitrobenzene, o-, m- and p-difluorobenzene, 2-fluoropyridine, pyrazine, 1,3,5-tritertiarybutylbenzene, benzaldehyde, and naphthalene.

The following examples illustrate this invention:

EXAMPLE 1

$XeF_2$ was prepared by the known method of exposing xenonfluorine mixtures to sunlight in a glass bulb and stored in crystalline form in evacuated nickel alloy U-tubes. 217 mg. $XeF_2$ and 215 μl. commercially obtained benzene were transferred under vacuum into a prefluorinated reaction vessel of 150 cc. volume forming a closed system. The vessel was heated to a temperature of 145° C. to ensure that the reactants were in the vapor phase. After after two minutes at the elevated temperature to permit the reaction to be completed, the vessel was cooled with Dry Ice to —78° C., and HF and xenon were pumped off. The HF and xenon may be recovered for reuse if desired. The organic products were transferred under vacuum to a glass container where the fluorinated benzene was analyzed by gas-liquid chromatography. 50% of the fluorine is available for fluorination (the remainder going to HF) and of that it was discovered that about 60 mole percent yield was obtained.

The chemical process taking place for benzene is as follows:

(1) $C_6H_6 + XeF_2 \rightarrow C_6H_5F + HF + Xe$

Some of the $C_6H_5F$ proceeds to o-, m-, and p-difluorobenzene.

EXAMPLES 2–10

The procedure followed in the preceding example was carried out using instead of benzene the aromatic compounds nitrobenzene, o-, m-, and p-difluorobenzene, 2-fluoropyridine, pyrazine, 1,3,5 - tritertiary-butylbenzene, benzaldehyde, and naphthalene.

For naphthalene, 376 mg. were reacted with 221 mg. $XeF_2$, and heated to a temperature of 200° C. With 2-fluoropyridine, in a 1.5 liter vessel, 3 cc. of the organic compound was reacted with 1.130 g. $XeF_2$ at a temperature of 100° C. The other reactions were similarly conducted.

In each case the vessel was heated to sufficient temperature to volatize the compound, the boiling point for each of the reactants varying somewhat. Yields in all cases were similar or comparable to that obtained with the benzene.

From the various examples it is concluded that vapor phase reactions with $XeF_2$ leads to facile, easily controlled substitution of aromatic compounds. The method offers advantages in the ease of preventing overreactions which occur in solution as well as being more economic and faster than previously known methods.

What is claimed is:

1. In a method of producing a fluorine derivative aromatic compound by steps which include reacting in a closed reactor vessel system equal molar amounts of an aromatic compound and $XeF_2$, wherein said aromatic compound is selected from the group consisting of benzene, nitrobenzene, o-, m- and p-difluorobenzene, 2-fluoropyridine, pyrazine, 1,3,5-tritertiary-butylbenzene, benzaldehyde, and naphthalene, the improvement which comprises producing the fluorine derivative by the substitution reaction by heating the reactor vessel to cause reaction between $XeF_2$ and said aromatic compound in the vapor phase.

2. The method of claim 1 in which the fluorinated compound following completion of the reaction is frozen to permit the removal of waste gaseous products.

References Cited

UNITED STATES PATENTS 3,694,444   9/1972   Klauke ........... 260—251 R
2,533,132   12/1950  McBee et al. ........ 260—653

FOREIGN PATENTS 1,163,582   9/1969   Great Britain ..... 260—250 A

OTHER REFERENCES

Shaw, M. J. et al.: *Reaction of Xenon Difluoride With Aromatic Compounds II*, J.A.C.S., 1970, 92(22), 6498–502 (Eng.).

Shieh, T. C. et al.: *Reactions of Xenon Fluorides With Organic Compounds*, J. Org. Chem., 1970, 35(12), 4020–4024.

Shaw et al.: "Reaction of Xenon Difluoride With Benzene," J.A.C.S., 91, 1563 (1969).

Shieh et al.: J.A.C.S., 86, 5021 (1964).

Shaw et al.: J.A.C.S., 91, 1563 (1969).

DONALD G. DAUS, Primary Examiner

R. D. McCLOUD, Assistant Examiner

U.S. Cl. X.R.

260—290 HL, 599, 646, 650 F, 651 F, 694; 423—262